United States Patent [19]

Lark

[11] Patent Number: 4,728,679
[45] Date of Patent: Mar. 1, 1988

[54] SIZING COMPOSITION, METHOD OF PREPARING SAME AND FIBROUS MATERIAL SIZED WITH SAME

[76] Inventor: John C. Lark, P.O. Box 321, Eden, N.C. 27288

[21] Appl. No.: 824,437

[22] Filed: Jan. 31, 1986

[51] Int. Cl.$^4$ .......................... C08K 9/12; D02G 3/00; B32B 7/02
[52] U.S. Cl. ....................................... 523/210; 524/47; 524/51; 524/492; 427/213.3; 427/220; 428/365
[58] Field of Search ........................... 524/47, 51, 492; 428/365; 427/213.3, 220; 523/210

[56] References Cited

U.S. PATENT DOCUMENTS

| | | | |
|---|---|---|---|
| 4,268,645 | 5/1981 | Lark | 525/437 |
| 4,409,285 | 10/1983 | Swerdlow | 428/323 |
| 4,600,735 | 7/1986 | Larsson et al. | 524/503 |

Primary Examiner—Delbert R. Phillips
Assistant Examiner—Nathan M. Nutter
Attorney, Agent, or Firm—Shefte, Pinckney & Sawyer

[57] ABSTRACT

A strength enhancing composition for treating textile materials in the sizing or dyeing process has been developed by the encapsulation or occlusion of colloidal silica particles with a water reducible polyester resin of intermediate molecular weight. The complex formation of the resin colloidal silica species is accomplished in an aqueous medium. The resin is prepared from isophthalic acid, diethylene glycol and trimellitic axhydride followed by neutralization with amine containing material to render the resin reducible in water. The composition may be combined with any of the conventional size materials, i.e. polyvinyl alcohol, starches, lubricants, etc., to enhance the performance of the sizing composition. The silica/resin complex may be formed in situ, or may be preformed, dried and pulverized for later use or for mixing with conventional, dry, sizing materials. The composition may be applied to textile yarns using conventional equipment, such as yarn slashers or dye machines, with the treated textile material having enhanced strength and performance characteristics.

25 Claims, No Drawings

SIZING COMPOSITION, METHOD OF PREPARING SAME AND FIBROUS MATERIAL SIZED WITH SAME

BACKGROUND OF THE INVENTION

The use of amorphous, dense, colloidal silica materials has long been desirable to provide a frictionizing effect on fibers and to increase the strength and performance of fibrous materials, such as textile yarns during weaving. Deposition of the small, dense, amorphous particles on the surface of a fibrous material promotes friction between adjacent fibers to produce an effect which might be compared to placing two pieces of sandpaper face-to-face. Luvisi U.S. Pat. No. 2,787,968, discloses in detail the effect of colloidal silica on various substrates.

However, the use of amorphous, dense, colloidal silica materials as frictionizing agents in water-based processing industries has not been widely accepted due to the inherent chemical nature of the colloidal silica itself. When water based colloidal silica is applied to an article in an aqueous process, the silica particles exist as small, discreet spheres. Upon removal of the process water, or the water carrier for the colloidal silica, the small silica particles follow their water carrier into a diminishing volume of carrier and steadily increasing silica particle concentration. When enough of the water carrier is removed, agglomeration of the colloidal particles occurs with the formation of large, very abrasive, amorphous granules. These large agglomerated silica granules are too large to provide an efficient frictionizing effect between fibers and are so abrasive that adjacent fibers may be severely weakened or cut by their action.

Vossos U.S. Pat. No. 3,629,139, and Kovarik U.S. Pat. No. 3,660,301, disclose a process for the production of organically coated colloidal silica sols which may be dispersed in non-polar organic solvents. The organosols produced by the cited teachings demonstrate the ability to be concentrated to yield dry, free-flowing, coated colloidal silica powders which may be redispersed in an organic media, and which retain the properties of the original colloidal silica. These teachings indicate that the drawbacks of agglomeration may be prevented when the colloidal silica particles have been modified by an organic surface coating and dispersed in an organic solvent. An attempt to exploit this technology in the textile industry was made based upon the teachings of Vossos and Kovarik in the cited patent references. This attempt was not commercially successful but did provide that the organically coated silicas, applied from non-polar solvents, retained their original size and shape as discreet particles without agglomeration. The coated silica particles were shown to be non-abrasive toward fiber, metal or ceramic surfaces which came into contact with the treated yarns. Due to the maintenance of the original size and shape of the colloidal silica particles, one of the most perplexing drawbacks of this treatment was that the frictionizing effect was so efficient that processing of treated fibrous material through subsequent steps was rendered very difficult. Equally important to the lack of acceptance of these materials was their incompatability with existing water based processes and a requirement for designing and installing equipment and process modifications. These changes would have made major capital commitments necessary for the use of these materials. These factors, coupled with an unattractive economic situation with the organosol in oil, made this concept unacceptable to the industry.

SUMMARY OF THE INVENTION

This invention relates to the preparation and application of strength enhancing compositions in and from aqueous media and the fibrous articles treated therewith. In its more specific aspects, this invention relates to the formation and application of organo polymeric-colloidal silica complexes produced in an aqueous media, for application from an aqueous media, to fibrous materials. In the course of the developments of the parameters necessary for the reduction of this invention to practice, it has been found that polymeric polyester resins are the materials of preference for use in the formation of the strength enhancing compositions. While other water soluble or dispersible polymers might find utility in the formation of the polymeric-colloidal silica complex, water soluble or dispersible polyester resins have been shown to provide additional benefits such as adhesion and plasticization of other materials applied to fibrous articles. The polyester resins have demonstrated outstanding utility in providing efficient polymeric-colloidal silica complexes during application of the strength enhancing materials to fibrous articles in wet processes.

Preferably, this invention relates to the application of polymeric organiccolloidal silica complexes to the sizing of textile yarns for the purpose of weaving yarns into textile materials. In this process, it is desirable before weaving to treat the warp yarn with a sizing composition or agent which adheres to and binds the fibrous components of the yarn. This treatment strengthens the textile yarns and renders them more resistant to abrasion during subsequent weaving operations. It is especially important that the sizing process and agent impart both abrasion resistance and added strength to the yarn due to the abrasion and stress encountered during fabric formation. Failure of the yarn during weaving lower both product quality and efficiency of the fabric formation process. It is also important that the sizing composition be easily removed from the fabric by a conventional desize or scouring operation. Removability of the sizing materials allows the desized fabric to be processed through subsequent dyeing and finishing operations without interference from residual materials. Various high number average molecular weight natural and synthetic materials have been suggested and are currently being utilized as sizing agents for yarns. Among such materials are starches of nearly all varieties and modifications, partially and fully hydrolyzed polyvinyl alcohols and copolymers, carboxymethyl cellulose, polymers derived from acrylic monomers, polymers derived from polyvinyl acetate and those derived from vinyl acetate monomers in combination with other monomers incorporated into the polymer via vinyl polymerization. Low and intermediate number average molecular weight polyester resins have also shown utility in yarn sizing applications. Depending upon the specific requirements and desired results, nearly all sizing compositions applied to spun yarns are comprised of the aforementioned materials, or any, or all, of their combinations.

The sizing composition of the present invention includes a complex of colloidal silica particles and polymeric resin in an aqueous medium. Preferably the silica particles are in the 20–50 millimicron range and the resin is an intermediate number average molecular weight (e.g. 3,000 to 7,000) polyester resin. In the preferred embodiment the resin is prepared from isophthalic acid, diethylene glycol and trimellitic anhydride, such as disclosed in Lark U.S. Pat. No. 4,268,645, neutralized conventionally with amine containing materials to render it reducible in water. The ratio of resin to silica particles is sufficiently high to result in substantial encapsulation or occlusion of the silica particles in the resin so that upon drying of the aqueous based composition on the sized material the silica particles will remain substantially discrete rather than agglomerating. The composition is prepared by mixing the colloidal silica and aqueous based resin along with the other components, or the silica and resin may be precomplexed and dried and later dissolution in water to form a sizing composition.

In the preferred embodiment the composition includes other conventional sizing components, such as lubricant, modified starch, and polyvinyl alcohol.

The present invention includes a fibrous product that has been sized with the aforesaid sizing composition.

As a result of the present invention, enhanced strength and performance are obtained for fibrous materials that have been treated with the sizing composition. For example, textile yarns composed of short or staple fibers exhibit enhanced strength and abrasion resistance during weaving as well as being easily cleansed of the composition during conventional desizing or scouring. Also, the sizing composition can be applied to weakened yarns to restore a measure of tensile strength to aid in the more efficient processing of these yarns into fabric.

Further advantages and applications of this invention should become obvious to those skilled in the art.

DETAILED DESCRIPTION OF THE PREFERRED EMBODIMENT

The following are examples of preferred embodiments of the present invention as applied to fibrous textile materials and the resulting effects upon the strength and efficiency of the treated materials during subsequent processing steps. These examples re merely illustrative and should not be construed as limiting the scope of the invention. It must be noted that no laboratory procedure has been widely accepted to predict the effect of a size or size additive in the weaving operation. For this reason, the examples involving the effect upon weaving efficiency were performed under mill scale conditions.

In each example, the polyester resin utilized was Pioneer Chemicals, Inc. resin PL 725 or PL401, which is of theoretical intermediate number average molecular weight (5,000–7,000) prepared from isophthalic acid, diethylene glycol and trimellitic anhydride as disclosed in Lark U.S. Pat. No. 4,268,645 and conventionally neutralized with an amine containing material (monoisopropylamine) having an acid number of at least 35 to render it reducible into water. Several different particle size colloidal silicas were utilized in the separate examples, the particle sizes being specified in the examples cited.

EXAMPLE 1

A control sizing composition not incorporating the present invention was prepared by mixing 380 gallons of water, 300 lb. of ethoxylated corn starch, 50 lb. of modified potato starch, 100 lb of polyvinyl alcohol, 200 lb. of aqueous based polyester resin at 25% solids, and 30 lb. of wax. This mixture was cooked under standard conditions and finished to a level of 505 gallons containing 11% total solids. 50/50 polyester/cotton yarn of 35% cotton count was sized through a commercial slasher with this composition. A single end of warp yarn sized with this formulation was collected on a winder located on the front end of the slasher. This yarn was submitted for laboratory strength and elongation testing, the results of which are set out in Table I below under the heading Example 1 Control. Sized warps based upon this formulation were used in weaving on a shuttle loom and exhibited an overall weaving performance of 93.20% over the life of the warps in the looms.

EXAMPLE 2

The size formulation detailed in Example 1 was utilized according to the present invention by the addition of 5.0 lb. of 20 millimicron colloidal silica solids in water. This mixture was processed under standard conditions and finished to 507 gallons of size. A single end of yarn sized with this composition was collected on a winder and submitted for laboratory strength and elongation testing, the results of which are set out in Table I below under the heading Example 2. Two full warps were sized with this composition and used in weaving on a shuttle loom to be compared to the warps from the same yarn set sized with the composition of Example 1 and exhibited an overall weaving performance of 97.45% over the life of the warps in the looms.

A comparison of the results of Example 2 and Example 1 are set out under the heading Percent Difference in Table I.

TABLE 1

| SINGLE END SIZED YARN COMPARISONS | | | |
|---|---|---|---|
| | EXAMPLE 1 CONTROL | EXAMPLE 2 TEST | PERCENT DIFFERENCE |
| % Elongation | 4.64 | 4.892 | +5.431 |
| Std. Deviation | 0.70 | 0.666 | −4.86 |
| Coeff. of Variation | 15.065 | 13.664 | −9.30 |
| Elongation Range | | | |
| High | 6.115 | 6.342 | +3.29 |
| Low | 2.83 | 3.308 | +16.89 |
| Range | 3.285 | 3.034 | −7.64 |
| Ave. gm to Break | 281.98 | 303.61 | +7.67 |
| Std. Deviation | 32.62 | 30.208 | −7.394 |
| Coeff. of Variation | 11.57 | 9.97 | −13.83 |
| Strength Range | | | |
| High | 367.67 | 365.876 | −0.469 |
| Low | 205.47 | 234.332 | +14.047 |
| Range | 162.14 | 131.554 | −18.864 |
| No. of Breaks | 100 | 250 | |

EXAMPLE 3

The mixture utilized in Example 2 was employed with the following modification. The 200 lb. of polyester resin in water was mixed with 5 lb. of 20 millimicron colloidal silica solids and additional water to maintain the mixed product system at a level of 25% solids. This mixture was stored for a period of 5 days and then cooked with the other ingredients as described in Examples 1 and 2. Two warps were sized with the composition containing the precomplexed polyester-colloidal silica material and used in weaving on a shuttle loom in comparison with warps from the same yarn set sized with the composition of Example 1. In this example, the warps sized with the composition of Example 1 provided a weaving performance of 93.31% in comparison with a performance of 97.42% for the test warps.

EXAMPLE 4

A mixture of 150 lb. of polyvinyl alcohol, 100 lb. of starch, 12 lb. of kettle wax and 2.5 lb. of 20 millimicron colloidal silica solids was cooked and applied to two warps of 65/35 polyester/cotton 35's cotton count yarn. These two warps were woven on projectile looms and compared with warps from the same yarn set sized without the addition of the colloidal silica. Yarns collected from these warps exhibited lower tensile strength in laboratory testing and lower weaving performance than the warps sized with the composition which did not contain the colloidal silica. No polyester-colloidal silica complex of the invention was present. The effects of the abrasive, agglomerated silica were apparent in lowered tensile strength and weaving efficiency.

EXAMPLE 5

The compositions of Example 1 and Example 2 were repeated on ½ set of yarn each of 50/50 polyester/cotton 35's cotton count yarn. The two ½ sets were woven on shuttle looms and compared directly by both total efficiency and industrial engineering studies. The ½ set sized with the composition of Example 1 exhibited a weaving performance of 91.6% and a warp stop level of 0.804/hour. The ½ set sized with the composition of Example 2 exhibited a weaving performance of 95.2% and a warp stop level of 0.497/hour.

EXAMPLE 6

200 lb. of carboxymethylated starch and 12 lb. of kettle wax were cooked and applied to 100% cotton yearn, 14's cotton count. Industrial engineering studies of shuttle weaving indicated that a warp stop level of 0.83/hour was obtained with this composition, which did not include the silica/resin complex of the present invention.

EXAMPLE 7

The composition of Example 6 was repeated with the addition of 80 lb. of 25% polyester resin in water. Water was added to maintain the same solids and add-on as in Example 6. Industrial engineering studies of shuttle weaving indicated a warp stop level of 0.69/hour with this composition, which did not include silica and therefore did not include the silica/resin complex of the present invention.

EXAMPLE 8

The composition of Example 7 was repeated with the addition of 2.5 lb. of 50 millimicron colloidal silica and applied to the same 14's 100% cotton count yarn utilized in Examples 6 and 7. Industrial Engineering studies of shuttle weaving indicated that these warps performed at a warp stop level of 0.42/hour.

EXAMPLE 9

A mixture of 100 lb. of polyvinyl alcohol, 100 lb. of ethoxylated corn starch and 12 lb. of kettle wax was cooked and finished to 200 gallons and applied to 100% cotton 20's cotton count yarn and woven on a Jacquard loom. This size composition performed at a warp stop level of 4.2/100,000 picks. This composition did not include the silica/resin complex of the present invention.

EXAMPLE 10

A mixture of 100 lb. of carboxymethyl cellulose, 100 lb. of ethoxylated corn starch and 12 lb. of kettle wax was finished to 200 gallons and applied to the yarn of Example 9 and woven on a Jacquard loom. This composition performed at a warp stop level of 4.4/100,000 picks. It did not include the silica/resin complex of the present invention.

EXAMPLE 11

A mixture of 180 lb. of ethoxylated corn starch, 72 lb. of 25% polyester resin solids, 12 lb. of kettle wax and 2.8 lb. of 25 millimicron colloidal silica solids was finished to 200 gallons and applied to the yearn of Example 9. This sized cotton yarn was woven on a Jacquard loom and performed at a warp stop level of 2.1/100,000 picks.

EXAMPLE 12

400 grams of polyester resin at 25% solids in water was mixed with 10 grams of 25 millimicron colloidal silica solids and the mixture brought to a total a 500 grams with water. This mixture was brought to the boil to remove water from the polyester-colloidal silica complex. After approximately 90% of the water had been removed, the mixture was transferred to a microwave oven and the remaining water removed from the product. The resulting dried film contained no apparent agglomerated silica particles upon examination under a low power microscope. Redispersion of the polymer film was accomplished at 200° F. in water with the aid of small amounts of aqua ammonia. The redispersed polymer in water was cooled and filtered through paper. No agglomerated silica particles were present on the filter paper. This procedure was utilized to establish the ratio of polyester resin solids to silica solids necessary to avoid the formation of agglomerated silica particles upon dry-down of the resin-silica complex.

Further laboratory tests were conducted to determine resin to silica ratios that would provide substantial silica encapsulation. The compositions were dried for observation of possible agglomeration rather than encapsulation and were also filtered to observe the presence of agglomerates. Results are set out in Table II below. These laboratory tests were performed utilizing an theoretical intermediate number average molecular weight polyester resin (approx 5,000–7,000) and a colloidal silica which averages 25 millimicrons. Film preparation of the higher resin/silica complexes (4/1 and 5/1) was also accomplished by mild acidification of the aqueous mixture with dilute acetic acid followed by drying the precipitated complex. The resin/silica ratios determined are based upon the specific particle size colloidal silica utilized. Larger particle size sols will exhibit encapsulation at a lower resin/silica ratio, and smaller particle size sols will require a larger resin/silica ratio due to the significant differences in surface area of the sols. In the same context, lower molecular weight polyester resins allow a lower resin-silica ratio due to the availability of a higher number of polymeric molecules per unit weight. In these tests the residue collected on the filter paper was washed with aqueous ammonia to remove any polyester resin. The agglomerated silica collected was not affected by the ammonia wash. The inorganic nature of the residue collected on the filter paper was confirmed by ignition of the filter paper and granular residue.

TABLE II

Effect of Polymer/Silica Ratio on Silica Encapsulation

| Parts Resin | Parts Silica | Dried Film Characteristics | Residue Collected on Filter paper |
|---|---|---|---|
| 0.5 | 1.0 | grainy | yes - inorganic |
| 0.75 | 1.0 | grainy | yes - inorganic |
| 1.0 | 1.0 | grainy | yes - inorganic |
| 3.0 | 1.0 | slightly grainy | yes - slight inorganic residue on filter |
| 4.0 | 1.0 | only a slight haze in film | none |
| 5.0 | 1.0 | clear | none |

EXAMPLE 13

A yarn package containing 600 grams of bleached 100% cotton yarn, 8's cotton count, was placed in a Gaston County laboratory package dye machine and the pH of the aqueous phase adjusted to 6.5 with dilute acetic acid. The package was subjected to a 35 minute mock dye cycle, followed by a standard drying and conditioning cycle. This yarn exhibited a low end break factor of 450 grams on a Uster single-end tester.

EXAMPLE 14

Water was added to a Gaston County laboratory package dye machine and the pH adjusted to 8.5 by the addition of dilute aqueous ammonia. 7.3 grams of a pulverized dry silica/resin complex containing 6.25 grams of polyester resin solids and 1.05 grams of 25 millimicron colloidal silica solids were added and the mixture circulated for a total of 20 minutes at ambient temperature. At the end of the 20 minute circulation cycle, the pH of the aqueous solution was adjusted to 6.5 with dilute acetic acid. A yarn package containing 600 grams of bleached 100% cotton yarn from the same lot cited in Example 13 was placed in the Gaston County package dye machine and a 35 minute mock dye cycle performed under the same conditions cited in Example 13. After a standard drying and conditioning cycle, the yarn exhibited a low end break factor of 525 grams on a Uster single-end tester. These results were consistent throughout the yarn package, indicating that the complex was exhausted uniformly in the mock dye procedure. A comparison of these results with those of Example 13 clearly indicates the advantage of the present invention, and that silica/resin complex of the present invention will perform in the same efficient manner as the complex formed in situ with the two components.

The present invention may be practiced by forming the composition before application, by preparing the silica/resin complex as a dry powder for in situ application or by forming the composition in situ during an operation such as dyeing.

It is contemplated that the resin used in the present invention may be of a number average molecular weight range other than intermediate and may be neutralized with basic nitrogen containing materials other than amines.

It is expected that colloidal silica particles of sizes different than in the foregoing examples may be used, such as in the range of 3 to 150 millimicrons, provided it is in the classification of a sol. Further, it is contemplated that additives, such as alumina may be usable with silica in the colloidal silica sol.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A sizing composition for treating fibrous materials comprising a complex of colloidal silica particles and polymeric resin in an aqueous medium, with said silica particles being substantially encapsulated in said resin.

2. A sizing composition according to claim 1 and characterized further in that said polymeric resin is a polyester resin.

3. A sizing composition according to claim 2 and characterized further in that said polyester resin is of an theoretical intermediate number average molecular weight in the range of 5,000 to 7,000.

4. A sizing composition according to claim 1 and characterized further in that said colloidal silica particles are of a size in the range of 20-50 millimicrons.

5. A sizing composition according to claim 2 and characterized further in that said polyester resin is a resin prepared from isophthalic acid, glycol and trimellitic anydride.

6. A sizing composition according to claim 5 and characterized further in that said polyester resin has been neutralized with amine containing materials to render it reducible in water.

7. A sizing composition according to claim 1 and characterized further in that said colloidal silica particles are of a size of approximately 20 millimicrons, said polymeric resin is an aqueous based polyester resin, and said composition includes modified starch, polyvinyl alcohol and lubricant.

8. A sizing composition according to claim 1 and characterized further in that said colloidal silica particles are of a size of approximately 50 millimicrons, said polymeric resin is an aqueous based polyester resin, and said composition includes modified starch and lubricant.

9. A sizing composition according to claim 1 and characterized further in that said colloidal silica particles are of a size of approximately 25 millimicrons, said polymeric resin is an aqueous based polyester resin, and said composition includes modified corn starch.

10. A composition soluble in water to form a size for fibrous materials comprising a pulverized dry complex of polyester resin and colloidal silica particles.

11. A composition according to claim 10 and characterized further in that the ratio of resin to silica in the complex is sufficiently high to result in substantial encapsulation of silica particles in resin.

12. A composition according to claim 11 and characterized further in that said silica particles are of a size of approximately 25 millimicrons and said ratio is at least 3 to 1.

13. A method of preparing a composition for sizing textile material comprising neutralizing a polyester resin with amine containing materials to render said resin reducible in water and mixing colloidal silica particles with said polymeric resin in an aqueous medium to substantially encapsulate said silica particles in said resin.

14. A method according to claim 13 and characterized further in that said polymeric resin is a polyester resin.

15. A method according to claim 14 and characterized further in that said polyester resin is of a theoretical intermediate number average molecular weight in the range of 5,000 to 7,000.

16. A method according to claim 13 and characterized further in that said colloidal silica particles are of a size in the range of 20-50 millimicrons.

17. A method according to claim 14 and characterized further in that said polyester resin is a resin prepared from isophthalic acid, glycol and trimellitic anhydride.

18. A method according to claim 17 and characterized further in that said colloidal silica particles are of a size of approximately 20 millimicrons, said polymeric resin is an aqueous based polyester resin, and said composition includes modified starch, polyvinyl alcohol and lubricant.

19. A method according to claim 13 and characterized further in that said colloidal silica particles are of a size of approximately 20 millimicrons, said polymeric resin is an aqueous based polyester resin, and said silica constitutes approximately 5 parts by weight of solids and said resin is approximately 25% solids and constitutes approximately 200 parts by weight.

20. A method according to claim 19 and characterized further in that included in the mixing are approximately 300 parts by weight ethoxylated corn starch, approximately 100 parts by weight polyvinyl alcohol 50 parts potato starch and approximately 30 parts by weight lubricant.

21. A method according to claim 13 and characterized further in that said colloidal silica particles are of a size of approximately 50 millimicrons, said polymeric resin is an aqueous based polyester resin, and said composition includes modified starch and lubricant.

22. A method according to claim 13 and characterized further in that said colloidal silica particles are of a size of approximately 50 millimicrons, said polymeric resin is an aqueous based polyester resin, and said silica constitutes approximately 2.5 parts by weight of solids and said resin is approximately 25% solids and constitutes approximately 80 parts by weight.

23. A method according to claim 22 and characterized further in that included in the mixing are approximately 200 parts by weight modified cornstarch and approximately 12 parts by weight lubricant.

24. A method according to claim 13 and characterized further in that said colloidal silica particles are of a size of approximately 25 millimicrons, said polymeric resin is an aqueous based polyester resin, and said silica constitutes approximately 2.8 parts by weight of solids and said resin is approximately 25% solids and constitutes approximately 72 parts by weight.

25. A method according to claim 24 and characterized further in that included in the mixing are approximately 180 parts by weight ethoxylated corn starch and approximately 12 parts by weight kettle wax.

* * * * *

UNITED STATES PATENT OFFICE
CERTIFICATE OF CORRECTION

Patent No. 4,728,679          Dated March 1, 1988

Inventor(s) John C. Lark

It is certified that error appears in the above-identified patent and that said Letters Patent is hereby corrected as shown below:

Title page:

Abstract, line 8   delete "axhydride" and insert therefor — anhydride —.
Column 1, line 43   delete "media" and insert — medium —.
Column 1, line 52   delete "provide" and insert — prove —.
Column 2, lines 11-12   delete "media" and insert therefor — medium —.
Column 2, line 30   delete "organiccoloidal" and insert — organic-colloidal —.
Column 2, line 41   delete "lower" and insert — lowers —.
Column 3, line 17   after "dried" insert —for storage—.
Column 3, line 44   delete "re" and insert — are —.
Column 4, line 6   after "35" delete "%" and insert — 's —.
Column 5, line 36   delete "yearn" and insert — yarn —.
Column 6, line 15   delete "yearn" and insert — yarn —.
Column 6, line 23   delete "a" (second occurrence) and insert — of —.
Column 8, line 37   delete "anydride" and insert — anhydride —.

Signed and Sealed this

Twentieth Day of February, 1990

Attest:

JEFFREY M. SAMUELS

Attesting Officer     Acting Commissioner of Patents and Trademarks